(12) United States Patent
Newman et al.

(10) Patent No.: US 7,184,718 B2
(45) Date of Patent: Feb. 27, 2007

(54) TRANSFORMABLE MOBILE STATION

(75) Inventors: Rhys Newman, Woodland Hills, CA (US); Nikolaj Bestle, Calabasas, CA (US)

(73) Assignee: Nokia Corporation, Espoo (FI)

( * ) Notice: Subject to any disclaimer, the term of this patent is extended or adjusted under 35 U.S.C. 154(b) by 633 days.

(21) Appl. No.: 10/207,950

(22) Filed: Jul. 30, 2002

(65) Prior Publication Data

US 2004/0203505 A1 Oct. 14, 2004

(51) Int. Cl.
*H04B 1/38* (2006.01)
*H04M 1/00* (2006.01)

(52) U.S. Cl. .................. 455/90.3; 455/566; 455/556.1; 455/575.1

(58) Field of Classification Search ............. 455/550.1, 455/556.1, 575.1, 566, 557, 349, 575.3, 90.1–90.3; 345/5, 108
See application file for complete search history.

(56) References Cited

U.S. PATENT DOCUMENTS

| | | | |
|---|---|---|---|
| 5,880,732 A * | 3/1999 | Tryding | 715/810 |
| 6,327,482 B1 * | 12/2001 | Miyashita | 455/566 |
| 6,480,372 B1 * | 11/2002 | Vong et al. | 361/680 |
| 6,549,789 B1 * | 4/2003 | Kfoury | 455/550.1 |
| 6,658,272 B1 * | 12/2003 | Lenchik et al. | 455/575.1 |
| 6,756,969 B2 * | 6/2004 | Nuovo et al. | 345/169 |
| 6,785,561 B1 * | 8/2004 | Kim | 455/566 |
| 6,939,576 B2 * | 9/2005 | Deshpande et al. | 427/223 |
| 6,968,206 B1 * | 11/2005 | Whitsey-Anderson | 455/556.1 |
| 2001/0027121 A1 * | 10/2001 | Boesen | 455/556 |
| 2002/0061770 A1 * | 5/2002 | Ozaki | 455/566 |
| 2004/0185914 A1 * | 9/2004 | Ohmura et al. | 455/566 |
| 2004/0204126 A1 * | 10/2004 | Reyes et al. | 455/566 |

* cited by examiner

*Primary Examiner*—Edan Orgad
(74) *Attorney, Agent, or Firm*—Alston & Bird LLP

(57) ABSTRACT

A transformable mobile station. The mobile station has a display that is substantially framed by the mobile station housing. The housing has two sections that are rotatably connected to each other so that in a first configuration they frame the display and in a transformed configuration, one or more sides of the display are unframed, and the unframed sides may be placed next to the display of another display-compatible mobile station. The two (or more) display-compatible mobile stations may be connected together such that their respective displays each form a portion of a larger, unified display.

20 Claims, 7 Drawing Sheets

TRANSFORMABLE MOBILE STATION

The present invention relates generally to the field of mobile station construction, and more specifically to a transformable mobile station design that permits enhanced connectivity with other compatible mobile stations.

BACKGROUND OF THE INVENTION

Mobile telephones are becoming ubiquitous. Once owned and carried only by the affluent, or by persons in specialized occupations that both required and supplied them, mobile phones are now owned by the many, and sometimes even by the majority of a given population. And no longer are mobile telephones used by only a small segment of the population, but rather now by people of all ages and walks of life.

There are several reasons for this widespread use of mobile phones. The first and foremost reason, of course, is technology. The development of a cellular system of organizing radio traffic has made possible the subscribing of thousands of customers in a single metropolitan area. Improved multiplexing and modulation techniques have contributed to the ability to handle vast numbers of customers. Coverage has improved as well; that is, the amount of geographic area in which a mobile-system subscriber is within range of a network antenna. At the same time, the cost of the mobile telephone itself and of a subscription to a mobile communications network have fallen and made mobile phone use affordable. Improved technology has also led to the development of ever-smaller and easier-to-use phones. As such improvements in technology often do, rising mobile-phone popularity led to increasingly large markets, which in turn encouraged further innovation.

Another, although perhaps secondary reason for the widespread popularity of mobile phones is their increasing functionality. Once simply radios or radio telephones, mobile phones have evolved to include such diverse functions as calendaring appointments, storing addresses and phone numbers, playing games, and even downloading Web pages. These latter functions, of course, attribute their existence to the technological increases that have provided greater processor power, memory and data storage, and wireless networks able to transmit a large amount of data. Correspondingly, the mobile phones' visual display has been greatly enhanced over the years. Originally, phones were often not equipped with a display, the user simply listened for a dial tone or dialed a series of numbers and depressed a button to transmit. To a limited extent, the various keys might be programmable, that is a special function assigned to a sequence of keys allowing for speed dialing (where pressing only a short sequence of keys nevertheless causes a full, prestored telephone number to be transmitted so that a connection may be established). The advent of simple displays, however, greatly improved upon this type of feature. Even using a simple display that shows only ten numbers, the user may view the number that is being dialed, or if the service is available, the number associated with an incoming caller. Originally, displays were made up chiefly of light emitting diodes (LEDs) that could form shapes corresponding to numbers and simple symbols. Other LEDs might be used to indicate an "on" or connected state, or to provide an indication that an incoming call was being received.

A huge increase in the variety of graphics that could be displayed accompanied the use of liquid crystal displays (LCDs) in mobile phones. An LCD uses a liquid-crystal substance sandwiched in between two thin pieces of transparent material. Small, almost invisible electrical connectors are distributed throughout the transparent plates in order to apply a small electrical potential to selected areas of the display. The electrical potential causes the crystals in the liquid crystal material to realign, blocking the light that would otherwise pass through and producing an image. Different filters can be used to produce different colors. The result is a far more versatile display than was easily achievable with the previous LED technology. Although an LCD consumes somewhat more power than an LED in its operation, batteries have also increased their storage capacity at the same time that many of the other mobile phone components are reducing their consumption.

The availability of this processor and display technology has led to the increased use of certain mobile-phone features. Although still valuable for voice communication, the proportion of use of a mobile phone dedicated to that function has decreased. Finding increasing use in many cases are the calendaring and game-playing functions. In fact, devices called personal digital assistance (PDAs), which evolved from a hand-held electrical device with no communication capability, are increasingly able to connect with a wireless network in the same way as a mobile phone. Whether any given device is basically a mobile phone with organizer functions added, or a PDA with mobile-communication functions added, the result is that the lines of distinction between the two devices are increasingly blurred. The same is true, although to a lesser extent for portable game-playing devices. Such devices that began as portable electronic games, are now able to connect with wireless networks either to perform the functions previously associated with mobile telephones or actually to enhance the game playing experience itself by allowing the game station to connect with a central server or with other users to utilize the capacity available there and in fact play the game with other participants.

Because of the convergence of these functions in differently-designed devices, such devices will collectively be referred to herein as "mobile stations". A mobile station is a portable electronic device having a display, preferably an LCD, along with user input apparatus such as a keypad. The mobile station preferably, although not necessarily, also has wireless communication capability.

The LCD on a mobile station may often be made larger, relative to the size of the station itself, than was previously done on mobile-phone LED displays. The larger screen is valuable in the game-playing environment, with modern games often requiring different areas of the screen be available for status information and creating the actual game environment. The larger display screen is also useful when Web pages are downloaded, if the mobile station has such capability. Although abbreviated versions of Web pages are at times available for downloading onto small handheld devices, Web pages still tend to be information rich and quickly use up the available display. Some features end up being quite small, or almost unintelligible. As mobile stations have evolved, however, there appears to be a trend toward the use of smaller and smaller devices. Naturally, this is possible because of the technological advances that have made components smaller and smaller, and allowed for the mobile stations themselves to be reduced in size. The smaller units have gained wide acceptance, primarily because they can be easily stowed in a pocket, belt-clip or hand bag, and take up very little room even when protected by a protective cover. Generally speaking, when the phones are used for wireless voice communication, a relatively small screen is still satisfactory. This trend to small phones runs counter, however, to the needs of mobile station users who like to use their device to play games or surf the Internet. This creates the need to enhance the game-playing and Web-surfing experience by allowing a user to connect multiple mobile stations to produce a single larger, high-resolution display. The present invention provides just such a solution.

SUMMARY OF THE INVENTION

The present invention is directed to a mobile station having a transforming enclosure that can be adapted for connecting to other display-compatible mobile stations. In one aspect, the invention is a mobile station enclosure that is divided into at least two portions, a display section, which houses the LCD or other display, and rotating section. The two sections are movable relative to each other to transform the mobile station between a single-unit and a multiple-unit, or game sharing configuration. In the single-unit configuration, the two enclosure sections form a frame around the LCD. In the multi-unit operational configuration, the rotating section has been relocated so that the LCD is exposed on at least one side. At least a second display-compatible mobile station may then be connected so that the two or more mobile-station displays are in position to produce a single, unified display.

In another aspect, the present invention is a mobiles station having an LCD, or other display device, mounted in a chassis and enclosed in a main enclosure section. The mobile station also includes a second enclosure section that rotates relative to the main section in order to transform the mobile station from a single-unit to a multiple-unit operational configuration. Transforming the mobile station to a multiple-unit operational configuration exposes at least one side of the chassis-mounted LCD so that it may be placed next to or near the display of a second, display-compatible mobile station. A connecting means, such as a connector pin and receptacle, is provided for making this connection. The connector pin may be mounted on a movable mount such that the pin may be extended for use and retracted when not in use. Where the movable mount is located on a side of the mobile station that is exposed in multi-unit configuration, the mount and the retracted pin may be hidden by the rotating enclosure section when the mobile station is transformed into single-unit configuration.

BRIEF DESCRIPTION OF THE DRAWINGS

For a more complete understanding of the present invention, and the advantages thereof, reference is made to the following drawings in the detailed description below.

DETAILED DESCRIPTION

The preferred embodiment of the present invention is a transformable assembly for enclosing a mobile station, such as a cellular mobile telephone. It is equally suitable, however, for other similar devices such as personal digital assistants (PDAs), Web-enabled phones, mobile gaming stations and the like. As mentioned previously, a "mobile station" may incorporate any or all of these features. To highlight the advantages of the present invention, however, a conventional mobile phone and a conventional portable electronic game device will now be described.

Figure 1:
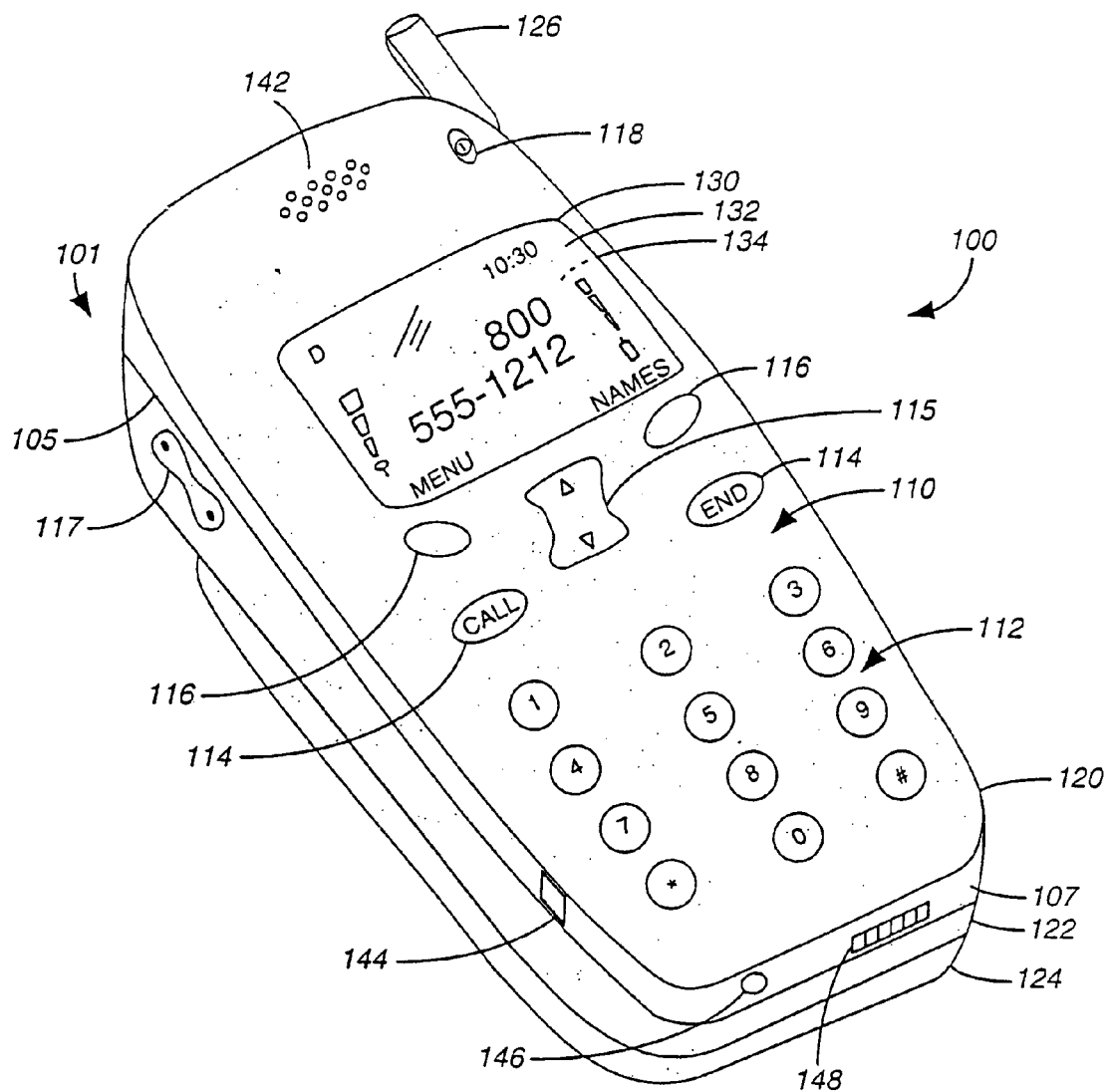
FIG. 1 is an isometric view of a conventional mobile station, in this case a mobile phone, according to the prior art.

FIG. 1 is an exterior isometric view of a typical mobile phone 100, according to the prior art. Mobile phone 100 is a radio telecommunication device for use in a cellular communication network. It contains a radio transmitter and receiver (not shown) for sending transmissions to nearby base stations that are in turn connected with the main network. The network itself naturally provides for intra-network communication, and also includes gateways through which other networks, such as the public-switched telephone network (PSTN) and the Internet may be accessed. Mobile phone 100 is most often used for real-time voice communication, but can be used for short-message-system (SMS) messaging, data transmission, Web surfing, and paging services as well.

The internal circuitry and components (not shown) of mobile phone 100 are contained in a casing, or enclosure, that typically includes two or more sections, which will sometimes herein be referred to as covers. Referring to FIG. 1, mobile phone 100 has an enclosure 101 that includes front cover 120 and back cover 122, which are removably fastened together at joint 105 when the phone is assembled. Front cover 120 and back cover 122 are not normally taken apart except for maintenance by a service technician. Front cover 120 and back cover 122 are normally made of a hard plastic material, such as polycarbonate/ABS. This material is strong enough to protect the telephone internals from reasonable shock encountered in ordinary operation and to resist penetration by objects that it may encounter when placed in a user's pocket, purse, or briefcase.

Several openings are formed in enclosure 101 of mobile phone 100, with most, though not necessarily all of them present in front cover 120. The keypad 110 is a user interface including a plurality of openings, through which protrude keys such as alphanumeric keys 112, call control keys 114, scroll key 115 and function keys 116. As their names imply, these keys perform various duties in the phone's operation, with the alphanumeric keys 112 having a standard telephone keypad role, and the function and scroll keys used in connection with display 134. That is, the function of the function and scroll keys are variable and determined by the application state that the mobile phone is in, which is translated into a word or icon displayed next to the key on display 134.

Display 134 is typically a liquid-crystal display (LCD) device. The LCD itself is protected by a plastic window pane 132, which is mounted to cover the display and protrude into window 130, an opening formed in front cover 120. As illustrated in FIG. 1, display 134 presents to the user such information as current function-key functions, telephone numbers, signal strength, and other information useful to the operation being performed. The protective window pane 132 is typically a component separate from the LCD, its chassis, and other portions of the internal assembly. Window pane is necessary because the components making up the LCD are fragile and subject to damage from even mild strikes.

Also formed in front cover 120 is a small opening for power switch 118 and a plurality of small openings 142 that serve as a port for the speaker (not shown), which is mounted beneath them. At the opposite end of mobile station 100, microphone port 144 likewise permits entry of sound directed at the actual microphone (not shown) mounted inside. In the embodiment of FIG. 1, microphone port 144 is formed in the side of front cover 120, but could be formed anywhere proximate to the expected voice source.

Located in the end 107 of front cover 120 are power port 146 for plugging in an external power adaptor and headphone port 148 for connecting an external headset and perhaps a microphone for hands-free operation. Power port 146 and headphone port 148 are receptacles for connecting (plugging in) an external appliance to the internal circuitry of mobile station 100. These receptacles are mounted within the mobile station's internal assembly (not shown) and are accessible from the outside through openings formed in end 107 of front cover 120. Note in this context that as used herein, the term "port" may refer to either a mere opening formed in the cover or to an electrical connection mounted in such an opening, with the distinction between these two types of port made only when necessary.

Back cover 122 frequently forms a recess (not shown) for receiving battery 124, to which it is removably attached during operation. In alternate versions, the battery may be received into an internal battery compartment and enclosed by the back cover or inserted into an opening in the back cover and protected or held in place by a separate battery cover. Also shown on back cover 122 is volume control 117, which, like the other keys, is accomplished by a key member protruding through an opening formed in the cover, in this case, back cover 122, that when manipulated by the user activates a switch located on the inner telephone assembly (not shown). Finally, radio transmission by the mobile station 100 shown in FIG. 1 is accomplished through use of antenna 126.

Figure 2:
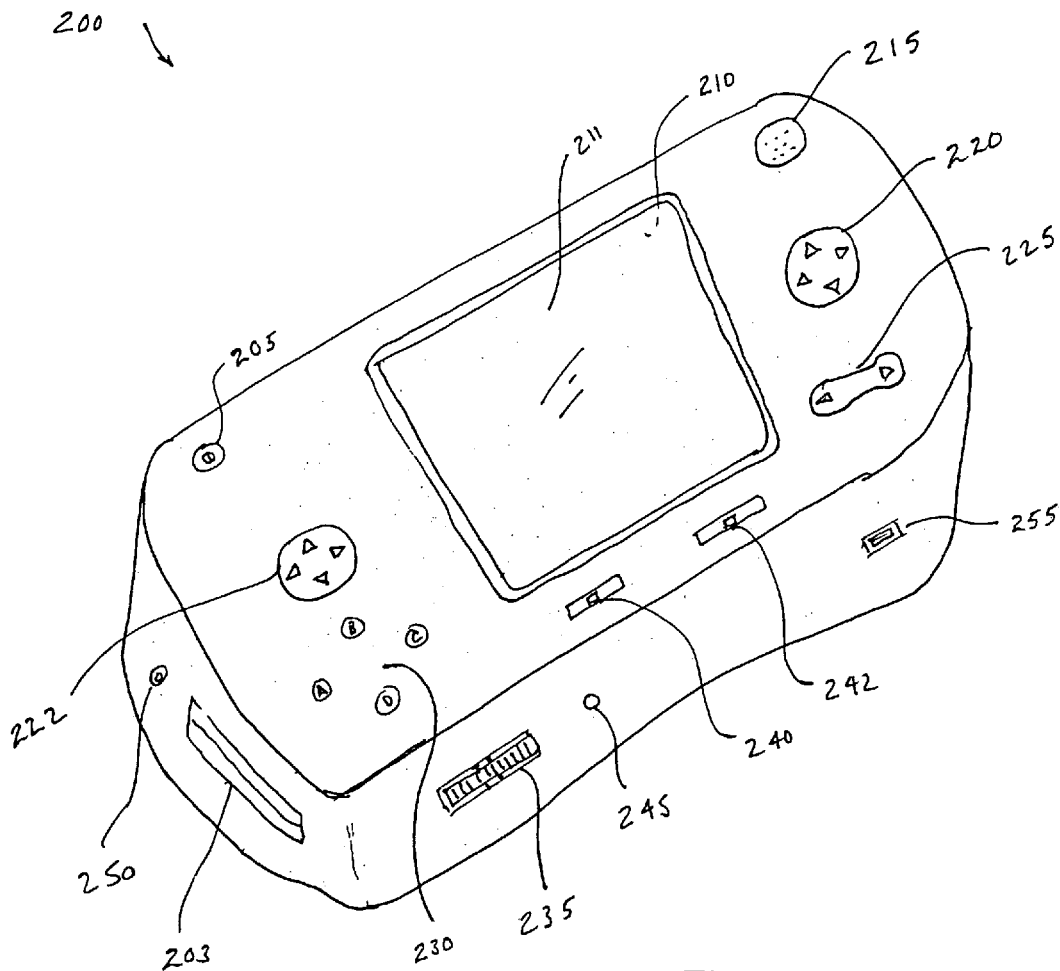
FIG. 2 is a portable electronic game unit of the prior art.

FIG. 2 is an isometric view of a conventional game station 200. In the example of FIG. 2, game station 200 is a portable electronic device that is used solely for playing games, being equipped with a controller (not shown) and other internal circuitry capable of executing appropriate game instructions. It is capable of playing a wide variety of different games, typically in conjunction with a cartridge-type memory device, which may be inserted into slot 203. The game cartridge (not shown) contains the device-readable instructions associated with each individual game, and is generally tailored to the particular type of game station for which it is intended. The game station may also have an internal memory containing games as well. Game station 200 is generally battery powered but may receive external power through power port 250 into which an AC adapter (not shown) may be inserted. Power key 205 is used to turn the station on and off. During operation of game station 200, the user may interact with the device in a number of ways. Display screen 210 is typically an LCD having sufficient resolution to permit game play. As in mobile telephones, LCD 210 is protected by plastic lens 211. LCD control switches 240 and 242 are used to control the quality of the graphical display, for instance, by adjusting contrast and brightness, respectively.

Most modern games are accompanied by some sort of audio presentation, complete with background music, alarms when various activities in the game occur, and perhaps even vocal instructions. Game station 200 is equipped with speaker 215 to enunciate the various audio signals, or the user may elect to plug in a headphone device (not shown) into headphone port 245. The volume is adjusted by a volume control 235. Game play itself is controlled, to the extent the user is able, by pointer keys 220 and 222, which in this example serve basically the same purpose but are redundant so that the player may use either hand in game play. Game station 200 also includes function keys 230 and rocker switch 225. While the exact function of each of these keys will depend somewhat on the specific game being played, their use is sufficiently standardized so that most experienced players take little time in familiarizing themselves with the operation in regard to a particular game. Multiplayer port 255 permits the attachment of a connecting wire (not shown), which may be used for connecting game station 200 with another, compatible game station. The specific game being played, of course, must support game play in some fashion by multiple players. As used here, "compatible" simply means that when connected together by the connecting wire or similar device, the two stations will be able to operate together as they are intended to do by the specific game. This will often involve the appearance of two "players" on display 210 (and on a similar display produced by the other game station), each player being able to control the movement of their own game piece. It may also involve trading points or other tokens which have been awarded for successful game play.

Game station 200 will tend to have a larger LCD 210 than the mobile phone 100 illustrated in FIG. 1. While this is not necessarily the case, a user who acquires a game station simply for playing games will be expected to more readily sacrifice the smaller design of the mobile phone for a larger display and more conveniently located (and specialized) keys. A subscriber acquiring a mobile phone, on the other hand, primarily for the purpose of its use as such, may also use the mobile phone for game play or Internet related activities, but not to the extent that a decision to go with a larger device might be made.

The present invention addresses the need for a combined device that is conveniently useful for both game play and as a mobile phone. It should be noted, however, that the invention is not directed to merely combining these two functions, but rather in the design and operation of the enclosure assembly and to the mode of operation for the device.

Figure 3:
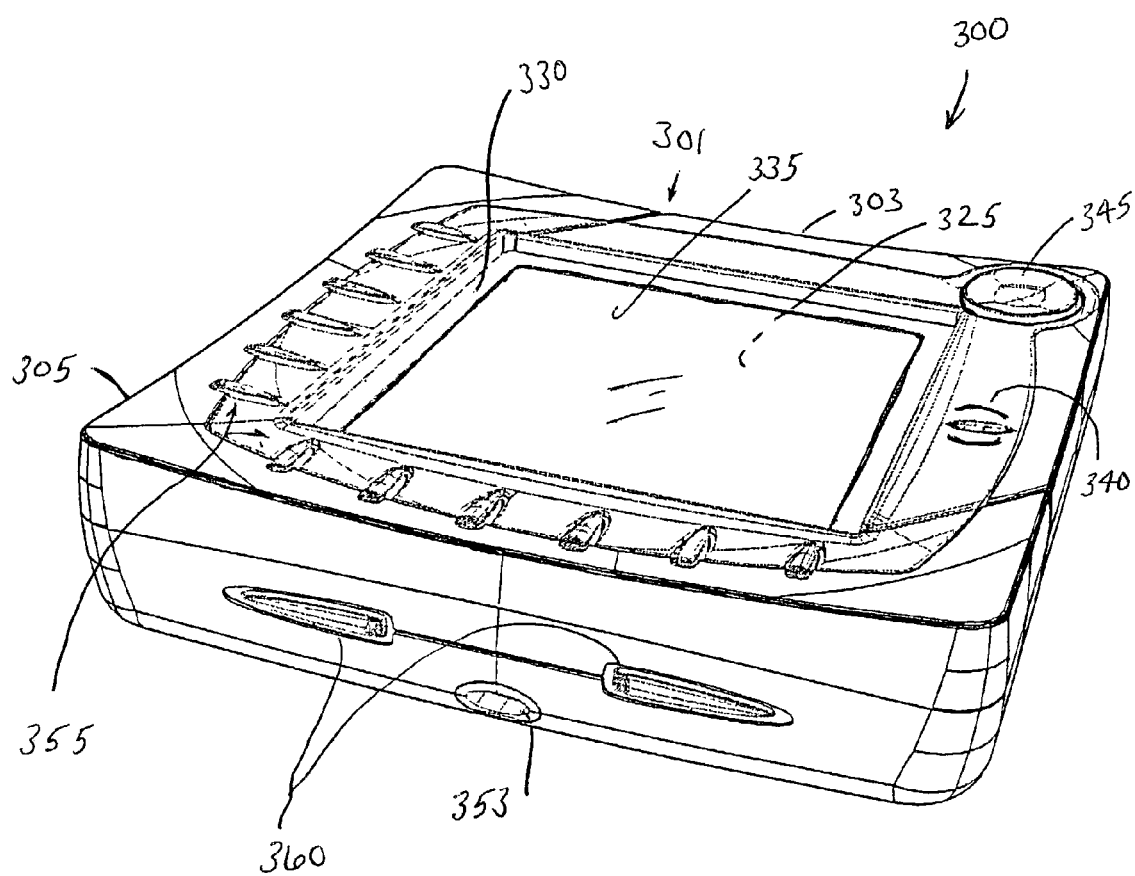
FIG. 3 is an isometric view of a transformable mobile station constructed according to an embodiment of the present invention.

FIG. 3 is an isometric view of a transformable mobile station 300 constructed according to an embodiment of the present invention. In this embodiment, mobile station 300 is conceived as both a mobile phone and a game station, however, it is not necessary to the invention that both of those functions be present. It is likely, however, that in addition to these two features, mobile station 300 may perform the duties of a PDA, calculator, and Web-site browser. As will become apparent, the mobile station design of the present invention is particularly suitable for display of Web pages in addition to the conduct of game play.

Although many of the features present in a device such as mobile station 300 should now be familiar, they will now be explained in terms of the design of the present invention. As with any similar device, the electronic circuitry that enables performance of the various functions is enclosed in an enclosure 301. This enclosure 301 is made up of two separate enclosure sections, namely display section 303 and rotating section 305. Together, these two enclosure sections make up or house all or substantially all of the mobile station 300. The various components that ordinarily make up a mobile station and game station of this kind are enclosed within the two enclosures section. For convenience, the terms "display section" and "rotating section" will include the respective section of enclosure 301, as well as the associated components (most of which are inside and not visible in FIG. 3). In the embodiment of FIG. 3, the display section 303 is so-called because it houses LCD 325. A protective chassis 330 and clear plastic lens 335 may also be considered part of display section 303. Some of the various components that are associated with each of these sections according to the embodiment of FIG. 3 are described below. Note, however, that there is no requirement any particular component be associated with any one section except where explicitly stated. Nor is there a requirement that the number of sections, or even major sections of the enclosure is limited to two.

At the outset it will be noted that mobile station 300 is capable of being used in a single-unit and a multi-unit operational configuration. (The multi-unit operational configuration will sometimes be referred to as the shared-gaming configuration.) The configuration is determined by the relationship of the two (or more) enclosure sections to each other, however, and not by the function or mode of operation that is currently being employed. That is, the single-unit or normal configuration shown in FIG. 3, is typically used when the mobile station 300 is being used as a mobile phone. In single-unit configuration, the rotating section 305 forms a part of a "frame" around LCD 325 (the remainder of the "frame" being formed by display section 303 of enclosure 301 itself). Framing the LCD 325 in this fashion provides a conveniently held game station and mobile station, two primary functions associated with mobile station 300. The advantages of multi-player mode of operation will be explained below, but note that mobile station 300 preferably may be used as a phone or game station in multi-player configuration as well. Again, as used herein, the configuration is determined by the relationship of the separate sections, and not by the specific function being performed by the mobile station 300.

In the embodiment of FIG. 3, it can be seen that the display section 303 includes the LCD 325 or other display. The section including the LCD will sometimes be considered the "main section", but is described as such for convention only. The LCD 325 being in the main section, however, it will typically include an LCD driver, mounted on a printed wire board (PWB) that also holds the main processor, the transmitter, the receiver, and other internal electrical components (not shown). The display section 303, typically being the larger section, will therefore normally house the battery as well. Speaker port 340 is formed in display section 303, as is an opening through which protrudes navigation button 345. Navigation button is a multi-directional pointing device normally used to move around objects displayed on LCD 325.

The rotating section 305 of mobile station 300 is typically though not necessarily the smaller section. It forms a series of openings to provide access to the numeric input keys 355, the menu scroll keys 360, and a series of gaming keys (not shown in FIG. 3). As can be seen in FIG. 3, laid out along the LCD 325 are the twelve numeric keys 355, taking advantage of the mobile station's unique configuration (the numeric keys 255 include the "*" and "#" keys, and may be used to input letters and other characters as well). A variety of key arrangements, however, may be used in accordance with the present invention. It should be clear that in this embodiment the only internal circuitry that needs to be enclosed in rotating section 305 is that associated with the operation of the keys themselves. The internal components, however, may be divided up for housing in either section as may be desired in a particular design. One or more electrical connections (not shown) provide the electrical connection (power and signaling) between the components enclosed in the rotating section 305 and those of the display section 303. In an alternate embodiment, no physical connection is necessary if power is available where needed and any necessary communication between sections is accomplished by other means, such as infrared transmissions. (A separate battery may be put in each section, for example.) In the embodiment of FIG. 3, the rotating section 305 also forms a microphone port 353.

Figure 4:
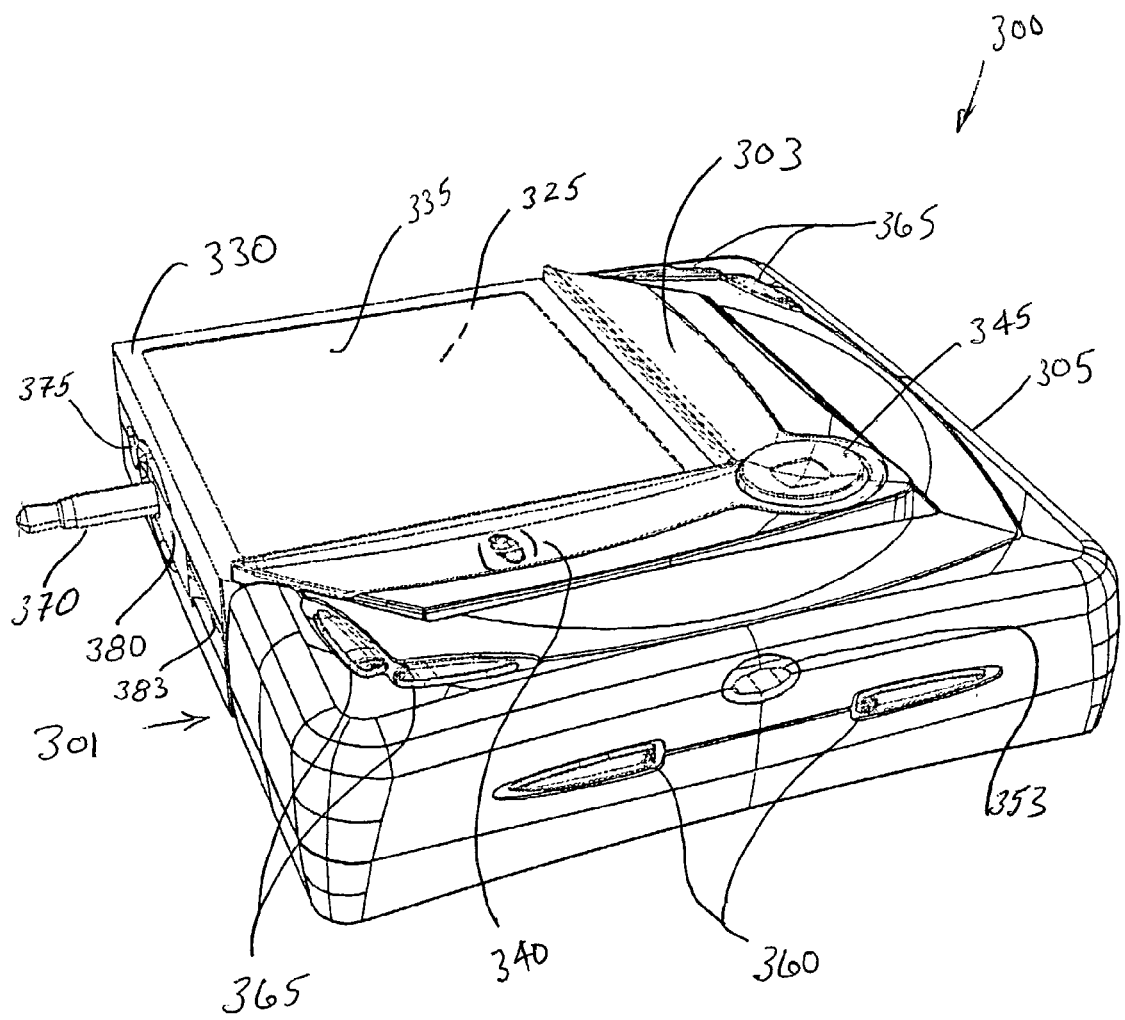
FIG. 4 is an isometric view of the mobile station of FIG. 3, shown with the rotating section in its multi-unit operational position.

FIG. 4 is an isometric view of the mobile station 300 of FIG. 3, shown with the rotating section 305 in the multi-unit operational (that is, shared-gaming) configuration. As should be apparent, mobile station 300 has transformed by the reconfiguration of its rotating section 305 with respect to display section 303. In this view, menu scroll keys 360 remain visible although the numeric keys 355 (see FIG. 3) are not. In addition, gaming keys 365 are now positioned next to LCD 325, a configuration suitable for game-playing. Note that in a preferred embodiment, the various keys are operable to perform their function regardless of the configuration assumed by mobile station 300. In an alternate embodiment, however, their function may vary according to whether mobile station 300 is in single-unit configuration or the multi-unit operational configuration. In yet another embodiment, the change in key function only occurs when mobile station 300 is actually connected to another mobile station. In this configuration, section 305 does not (directly) frame LCD 325, but actually frames the LCD-framing structure of display section 303. In this embodiment, this configuration leaves two sides of the square (or rectangular) LCD 325 unframed. Naturally, there must be some structure present as necessary to retain LCD 325 securely in place, a function performed by chassis 330. The user, however, preferably perceives little if any border on the unframed sides of the LCD 325.

In this preferred embodiment, the unframed side or sides of LCD 325 may be placed next to another, display-compatible mobile station to create a unified display. A "unified display" is a graphic presentation (image) shown on a plurality of individual mobile stations, the display associated with each mobile station showing only a portion of the entire unified display. Mobile stations that may be linked together to achieve this effect are herein called "display compatible." This operation will now be explained.

Mobile station 300 is preferably a stand-alone unit, that is, it is capable of performing its intended functions on its own. These have already been specified in this embodiment as being at least a mobile telephone and a game-playing unit. In accordance with the present invention, however, the mobile station may also function as a part of a larger unit. This function is performed when mobile station 300 is connected to a second display-compatible station, and the graphic presentation that might ordinarily be displayed on a single LCD is divided, with one half being displayed on the LCD 325 of mobile station 300 and one half being displayed on the other display-compatible mobile station (not shown in FIG. 4). Note that a geometric "one-half" is not required— the single display is simply split into two portions, although they are preferably roughly equal in size. The split graphic image, with one-half being presented on one display and one-half on the other may be any graphic presentation that might otherwise be displayed on only a single LCD. (It could even appear to be two separate graphic presentations with each presentation being displayed on a separate LCD.) To create a unified display using multiple mobile stations, of course, there must be some way to connect them together. In the embodiment of FIGS. 3 and 4, this is a physical connector pin 370. When two stations are connected, pin 370 is received into a receptacle formed for this purpose in the other mobile station. Receptacle 375 in mobile station 300 likewise serves to receive the pin of another mobile station. Note that when mobile station 300 is in single-unit configuration, the pin 370 and receptacle 375 are hidden and protected by rotating section 305. Pin 370, in this embodiment, is mounted on rotating mount 330 so that it may be swung into recess 383 so as to be out of the way of rotating section 305 when mobile station 300 is transformed back into single-unit configuration (or simply when it is not being used). There may be any number of pins and receptacles of course, and they may be arranged in any convenient manner. In addition to transmitting electronic signals between various units, of course, electric power from a single or multiple sources could be shared as well.

In addition to physical connectors, wireless connections may be used. If mobile station 300 and another display-compatible unit are capable of communications through a wireless network, for example, the connection may be through the network. More simply, it may be made through infrared or other optical transmitters and receivers, or using a short-range radio frequency connection. A physical connector does have the advantage of being able to hold the connected mobile stations in a fixed relationship to each other, but of course this may be accomplished in other ways as well.

Figure 6:
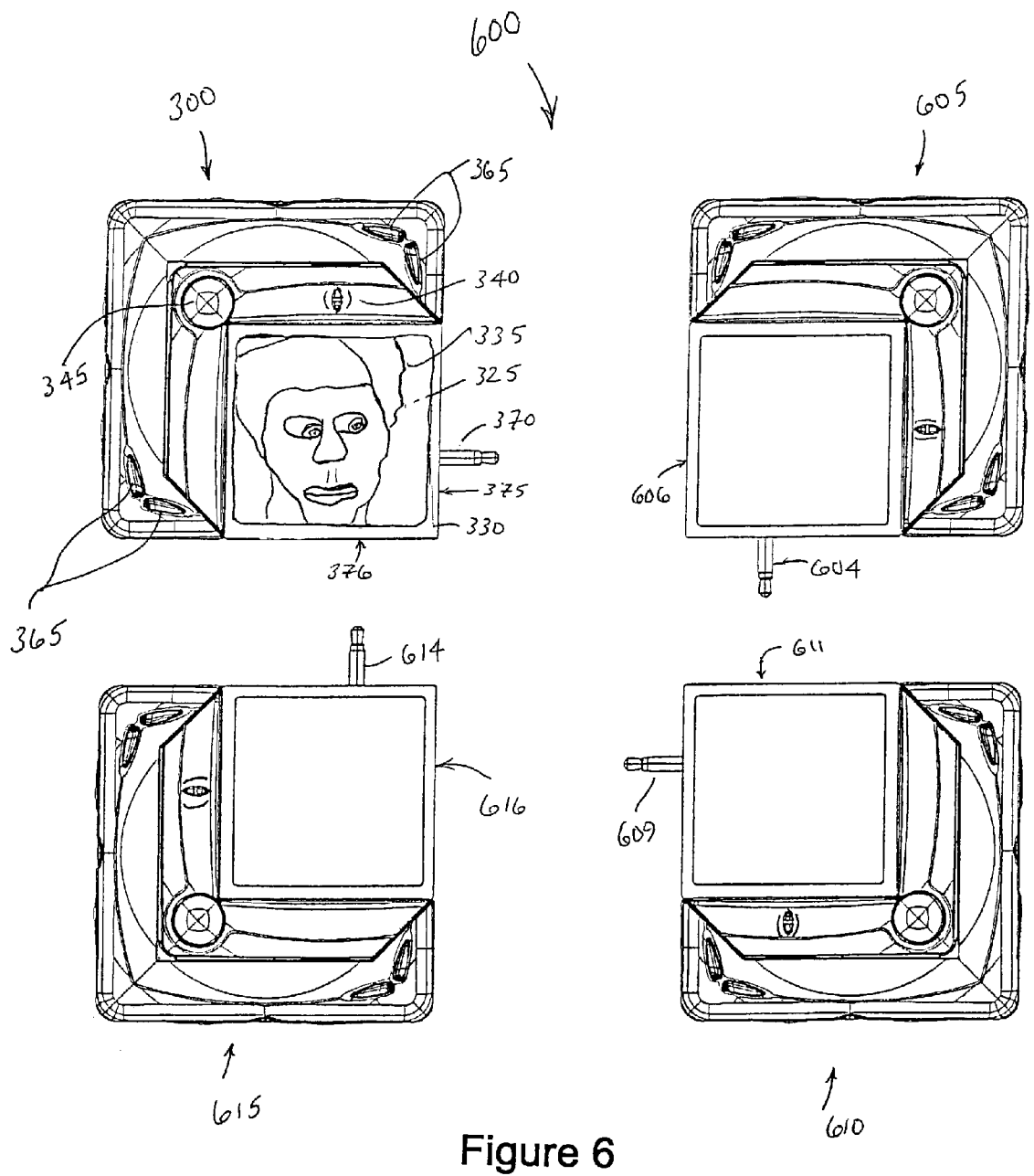
FIG. 6 is an illustration of a set of four mobile stations constructed according to an embodiment of the present invention, each having their rotating section in the multi-unit operational configuration.
Figure 7:
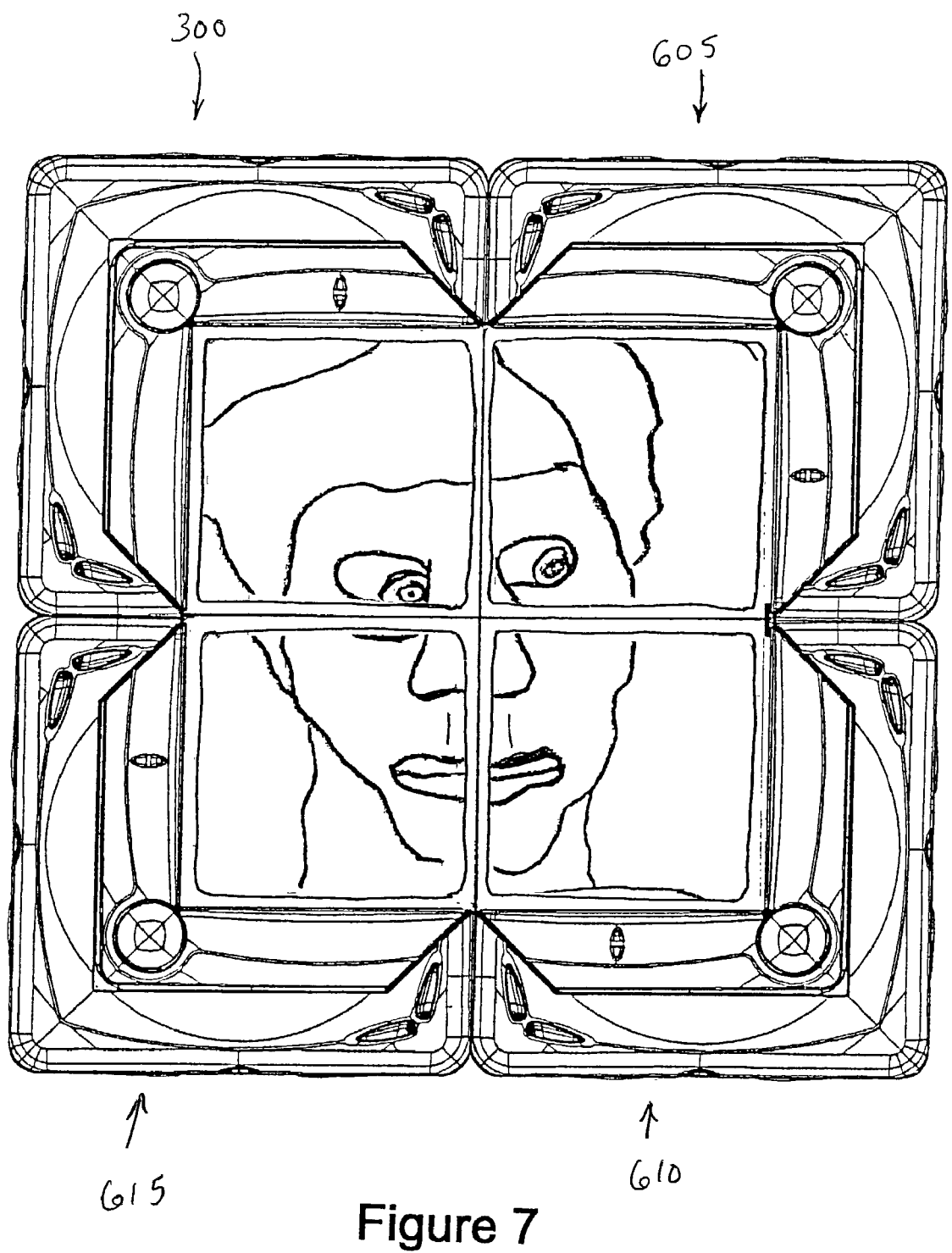
FIG. 7 is an illustration the set of four mobile stations of FIG. 6, in this view connected together for producing a unified display.

In the embodiment of FIGS. 3 and 4, a third and a fourth display compatible mobile station may also be added, and the unified display being divided up and displayed accordingly. In other words, as each display compatible mobile station is added, the display is divided into as many (again, preferably equal) portions as there are mobile stations. The advantage of this feature is illustrated in FIGS. 6 and 7. FIG. 6 is a plan view of a set 600 of four mobile stations, each constructed according to an embodiment of the present invention, and each having their respective rotating section in the multi-unit configuration. In this illustration, four mobile stations 300, 605, 610, and 615 have been placed in proximity to each other. Although they are shown to be substantially identical in design, this is not a requirement as long as they are display-compatible. In FIG. 6, each mobile station has a rotating section such as rotating section 305 and all rotating sections have been transformed into the multi-unit operational mode. Connecting pin 370, as well as pins 604, 609, and 614 are extended and ready to be received into receptacles 606, 611, 616, and 376, respectively. Note that although these receptacles are not visible in FIG. 6, their location is indicated and their configuration should be apparent. (A number of pins and receptacles may be present to accommodate the connection of, for example, two or three mobile stations instead of four.) As shown in FIG. 6, however, the stations have not been connected, and therefore each station is still functioning on its own. Accordingly, each separate display presents a graphic image associated with whatever function is being performed by the respective mobile station (if any).

FIG. 7 is an illustration of the set 600 of four mobile stations as shown in FIG. 6, in this view connected together in a multi-unit configuration in order to produce a unified display. In this preferred embodiment, a single graphic presentation, that is graphic image, is presented using the four available LCD screens instead of just one. As mentioned above, the unified display may be divided up in any number of different ways, including simply dividing up the graphic presentation into four roughly equal sections and causing each section to be displayed on a separate device. (The distinction from independent operation then being only the manner in which the display is created.)

Generally speaking, however, the greatest advantage of the present invention will obtain when all four (or whatever number) of LCDs combine to create a single image. This image may be produced with greater resolution and of course is larger and easier to see. In order to produce this unified display, the connected mobile stations must be capable of surrendering control of their respective LCD display to a single graphic-presentation function. In one embodiment, one of the mobile stations is chosen as the master unit, producing the signals necessary to send to each separate LCD driver (not shown) in order to produce the appropriate portion of the unified display. In another embodiment, this unified display is generated by the combined computing capabilities of two or more of the mobile stations. Note that as long as one of the mobile stations is capable of generating such instructions and the others are capable of applying them, a unified display will be possible. In one embodiment, some of the display-compatible mobile stations will be "master units" and some will be "slave units". The distinction being that the slave units are not independently capable of generating a unified image for display on all of the mobile stations. Naturally, in order to create a unified display at least one master unit must be present.

In a preferred embodiment, the user or users associated with the separate mobile stations will be able to select which of the combined units are to participate in generating the unified display. That is, even when connected together as shown in FIG. 7, the mobile stations may operate independently. In another embodiment, the act of connecting the mobile stations together automatically switches the display drivers to produce a unified display. The control keys associated with each separate mobile station would in the connected embodiment be operable to perform other function independently or in a unified faction as well. For example, the four mobile stations connected together (as shown in FIG. 7), each belonging to separate game players, would produce a unified display that responds to game input provided by each of the players using the keypads of their own mobile station (or separate keypads (not shown) that have been connected for this purpose). Finally, note that although the combination of four square or rectangular mobile stations into a larger square or rectangular configuration is a preferred and convenient embodiment, but others are certainly possible.

Figure 5:
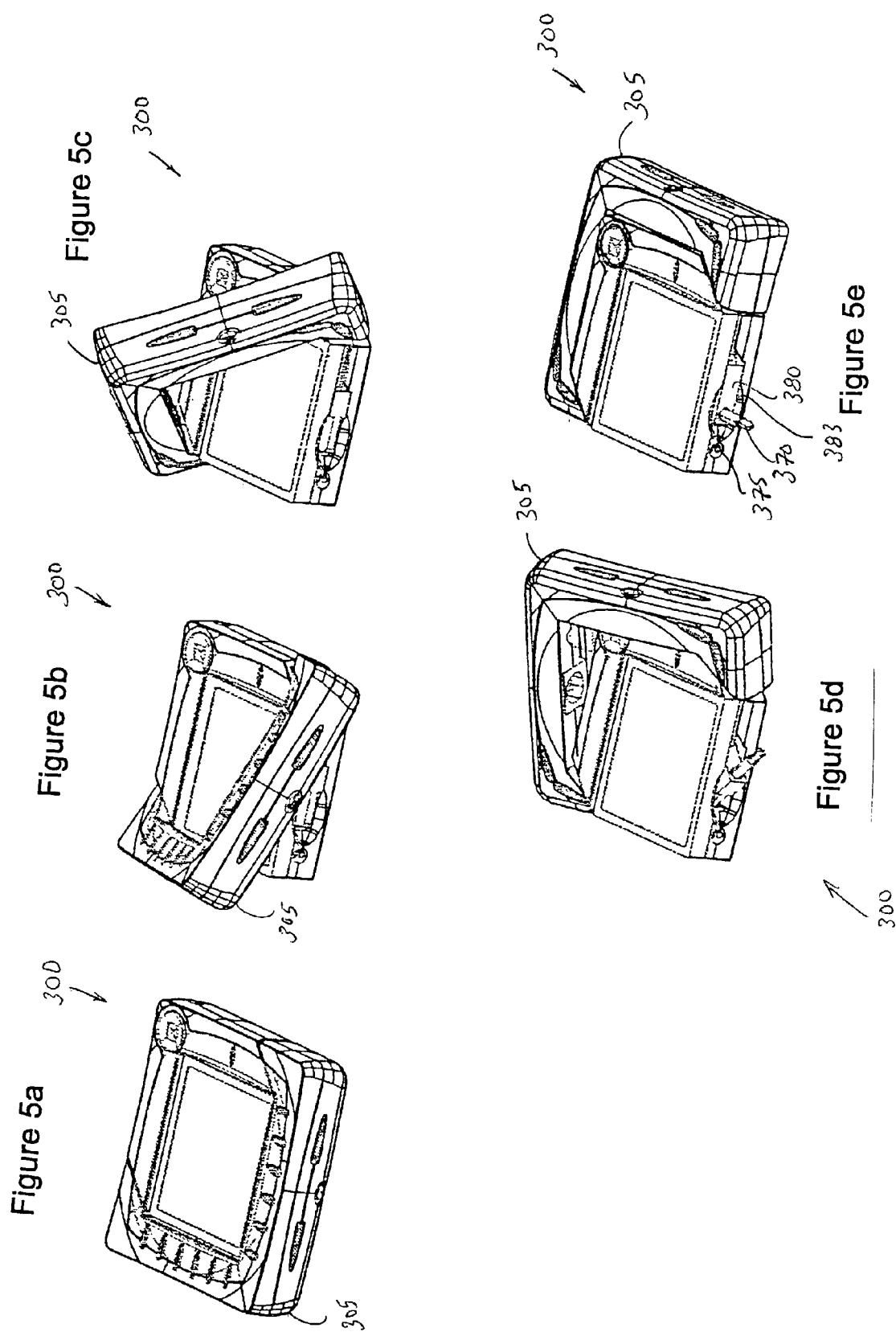
FIGS. 5A through 5E show the mobile station of FIGS. 3 and 4 in various stages of rotating-unit movement to illustrate the operation of transforming from a single-unit configuration to a multi-unit operational configuration.

FIGS. 5a through 5e illustrate the transforming process. Each of these illustrations, viewed in succession, shows the rotating section 305 being moved from its single player configuration to its multi-unit operational configuration. In this preferred embodiment, rotating section 305 is rotatably attached to display section 303, and the two sections remain physically (and electronically) connected throughout the transforming process. This is not required, however, and the rotating section 305 may actually be physically separable from display section 303 and simply removed and reattached in its new configuration to achieve the transformation. Note that in this embodiment, rotating mount 380 is operated to extend connector pin 370 from its position in recess 383 (in FIG. 5b) to its fully extended position (FIG. 5e). This may be accomplished through an internal mechanical connection that causes rotating mount 380 to rotate as rotating section 305 is moved, or the extension of pin 370 may simply be done manually by the user.

The preceding descriptions are of preferred examples for implementing the invention, in order to make its practice and application clear to one of ordinary skill in the art. The scope of the invention, however, should not necessarily be limited by this description. Rather, the scope of the present invention is defined by the following claims.

What is claimed is:

1. A mobile station having internal components, comprising:
   an enclosure having at least a first enclosure section and a second enclosure section being movable relative to each other to transform the mobile station between a first operating configuration and a second operating configuration, the first enclosure section including a first frame portion and the second enclosure section including a second frame portion, the enclosure for enclosing the internal components of the mobile station;
   a display housed in the first enclosure section, the display defining a display perimeter, the first frame portion framing a first segment of the display perimeter, and the second frame portion framing a second segment of the display perimeter when the mobile station is in the first operating configuration; and
   a connector for connecting the mobile station together with at least one display-compatible mobile station.

2. The mobile station of claim 1, where as at least a portion of the internal components are housed in the second enclosure section.

3. The mobile station of claim 2, further comprising a user input device housed in the second enclosure section, wherein the portion of the internal components housed in the second enclosure section comprises internal components for the user input device.

4. The mobile station of claim 1, wherein the second frame portion of the second enclosure section does not frame the second segment of the display perimeter when the mobile station is in the second operating configuration.

5. The mobile station of claim 4, wherein the second frame portion of the second enclosure portion frames the first frame portion of the first section of the enclosure when the mobile station is in the second operating configuration.

6. The mobile station of claim 4, wherein the mobile station is configured to connect to a display-compatible mobile station along the second segment of the display perimeter when the mobile station is in the second operating configuration.

7. The mobile station of to claim 1, wherein the second enclosure section is rotatably attached to the first enclosure section such that the second enclosure section may be rotated from its position in the first operating configuration to its position in the second operating configuration.

8. The mobile station of claim 1, wherein the connector comprises a pin and a receptacle.

9. The mobile station of claim 8, wherein the pin is movable between a retracted position and an extended position.

10. The mobile station of claim 9, wherein the pin is rotatable between the retracted position and the extended position.

11. The mobile station of claim 8, wherein the pin cannot be moved from its retracted position when the second enclosure section is in the first operating configuration.

12. The mobile station of claim 1, wherein, when the mobile station is in the second operating configuration, the second frame portion does not frame the second segment of the display perimeter so that the second segment is substantially unframed and configured to be placed adjacent to a substantially unframed segment of a display perimeter of a display on the display-compatible mobile station.

13. The mobile station of claim 1, wherein, the first and second enclosure sections are permanently attached to the mobile station.

14. A mobile station having internal components, comprising:
   an enclosure having at least a first enclosure section and a second enclosure section being movable relative to each other to transform the mobile station between a first operating configuration and a second operating configuration, the enclosure for enclosing the internal components of the mobile station;
   a display housed in the first enclosure section, the display defining a perimeter; and
   a connector for connecting the mobile station together with at least one display-compatible mobile station, wherein the connector is incapable of connecting to the at least one display-compatible mobile station when the mobile station is in the first operating configuration, and wherein the connector is capable of connecting to the at least one display-compatible mobile station when the mobile station is in the second operating configuration.

15. The mobile station of claim 14, wherein the connector is housed in the first enclosure, and wherein the connector is covered by the second enclosure section when the mobile station is in the first operating configuration and uncovered when the mobile station is in the second operating configuration.

16. The mobile station of claim 14, wherein the connector comprises a pin and a receptacle, and wherein the pin is fixed in a retracted position when the second enclosure section is in the first operating configuration.

17. A frame assembly comprising:
   a mobile station having internal components;
   an enclosure having at least a first enclosure section and a second enclosure section being movable relative to each other to transform the mobile station between a first operating configuration and a second operating configuration, the first enclosure section including a first frame portion and the second enclosure section including a second frame portion, the enclosure for enclosing the internal components of the mobile station;
   a display housed in the first enclosure section, the display defining a display perimeter, the first frame portion framing a first segment of the display perimeter, and the second frame portion framing a second segment of the display perimeter when the mobile station is in the first operating configuration; and
   a connector for connecting the mobile station together with at least one display compatible mobile station.

18. The frame assembly of claim 17 wherein the display and the display compatible mobile station together display a unified display, each of the display and the display compatible mobile station displaying a portion of the unified display.

19. The frame assembly of claim 18 wherein the unified display comprises a split image display.

20. The frame assembly of claim 17 wherein the display and the display-compatible mobile station display separate graphic presentations.

* * * * *